United States Patent [19]

Stickel et al.

[11] Patent Number: 5,309,939
[45] Date of Patent: May 10, 1994

[54] SAFETY DEVICE FOR WATER-CONDUCTING HOUSEHOLD APPLIANCES

[75] Inventors: Ernst Stickel, Giengen; Rüdiger Eiermann, Staufen; Helmut Jerg, Giengen, all of Fed. Rep. of Germany

[73] Assignee: Bosch-Siemens Hausgeräte GmbH, Munich, Fed. Rep. of Germany

[21] Appl. No.: 911,458

[22] Filed: Jul. 10, 1992

[30] Foreign Application Priority Data

Sep. 18, 1990 [DE] Fed. Rep. of Germany ....... 4029543

[51] Int. Cl.⁵ ................ F16K 31/18; F16K 33/00
[52] U.S. Cl. .................... 137/387; 134/57 D; 137/412; 137/429; 200/84 R; 417/41; 417/44 R
[58] Field of Search ............... 137/312, 386, 387, 429, 137/412; 68/208; 134/57 D, 58 D; 200/84 R, 84 B, 190; 417/40, 41, 44, 45, 46

[56] References Cited

U.S. PATENT DOCUMENTS

| | | | |
|---|---|---|---|
| 3,334,651 | 8/1967 | Clearman | 137/387 |
| 3,344,804 | 10/1967 | Lyman | 134/57 D |
| 3,397,716 | 8/1968 | Anderson | 68/208 |
| 3,464,437 | 9/1969 | Zane | 137/387 |
| 3,885,580 | 5/1975 | Cushing | 137/387 |
| 4,168,615 | 9/1979 | Condit | 137/387 |
| 4,180,085 | 12/1979 | Berges et al. | 137/387 |
| 4,180,095 | 12/1979 | Woolley et al. | 137/387 |
| 4,741,357 | 5/1988 | Battel et al. | 137/387 |

FOREIGN PATENT DOCUMENTS

| | | |
|---|---|---|
| 7247582 | 12/1972 | Fed. Rep. of Germany . |
| 3003440 | 8/1981 | Fed. Rep. of Germany . |
| 3425663 | 1/1986 | Fed. Rep. of Germany . |
| 3942168 | 6/1991 | Fed. Rep. of Germany . |
| 1591008 | 5/1970 | France . |
| 2202285 | 5/1974 | France . |
| 2290498 | 12/1987 | Japan ..................... 68/208 |
| 1081082 | 8/1967 | United Kingdom ................ 137/387 |
| 2067891 | 8/1981 | United Kingdom . |
| 2166645 | 5/1986 | United Kingdom . |

*Primary Examiner*—George L. Walton
*Attorney, Agent, or Firm*—Herbert L. Lerner; Laurence A. Greenberg

[57] ABSTRACT

A water-conducting household appliance includes a liquid container having a static content level, a fill control device, a cycle control unit, an inflow valve to be opened by the cycle control unit and closed by at least one of the fill control device and the cycle control unit, an evacuation pump, a switch having a switching position in which the switch turns on the evacuation pump and selectably closes the inflow valve, and a chamber hydraulically communicating with the liquid container and having an opening for the entry of water. A safety device for the appliance includes a safety level switch device having a float disposed in the chamber, the float having a switching position in which the float acts upon the switch, and the float having a position of repose in which the float is kept at a distance above the static content level and in which the float acts upon the switch to switch off the evacuation pump.

12 Claims, 1 Drawing Sheet

SAFETY DEVICE FOR WATER-CONDUCTING HOUSEHOLD APPLIANCES

CROSS-REFERENCE TO RELATED APPLICATION

This application is a Continuation of International Application Serial No. PCT/EP91/01592, filed Aug. 21, 1991, now WO92/04855.

The invention relates to a device for water-conducting household appliances, having a liquid container, fill control means, an inflow valve that can be opened by a cycle control unit and closed by the fill control means and/or the cycle control unit, an evacuation pump, and a safety level switch device in which a float is disposed in a chamber that communicates hydraulically with the liquid container and has an opening for the entry of water, and which, in the switching position, acts upon a switch that in the switching position turns on the evacuation pump and if applicable closes the inflow valve.

German Petty Patent DE-GM 72 47 582 discloses a safety device for such household appliances that has a liquid container, fill control means, an inflow valve that can be opened by a cycle control unit and closed by the fill control means and/or the cycle control unit, an evacuation pump, and a safety level switch device, in which a float is disposed in a chamber that communicates hydraulically with the liquid container and has an opening for the entry of water, and which, in the switching position, acts upon a switch that in the switching position turns on the evacuation pump and if applicable closes the inflow valve.

In such household appliances, for instance due to air trapped in the evacuation pump, it is possible for not all of the water with which the appliance is filled to be pumped out at the end of a cycle segment to be terminated, because typically such evacuation pumps are not self-aspirating and are therefore only limitedly capable of pumping air. In the safety device according to German Petty Patent DE-GM 72 47 582, the switch stays in the switching position. If the aforementioned malfunction occurs, a disadvantage of that device is that the liquid container of the appliance is evacuated completely during an ongoing cycle. For a cycle segment that includes water heating, it causes the appliance to stop because of the response of the temperature sensor that is usually present to keep the heater from overheating, and in cycle segments without such protective monitoring it at least worsens the outcome of the work and leads to high water consumption. Proper cycling cannot occur until after some intervention into the appliance is made, for example by a service call initiated by the user. In German Petty Patent DE-GM 72 47 582, the chamber is also mounted directly on the liquid container, and the fill level at which the float disposed in the chamber is intended to float and actuate the switch is predetermined by an opening located at the level between the normal fill level and the warning fill level. The water surface, which is necessarily highly agitated over the course of the cycle, causes water to enter the chamber in the absence of a safety situation and thus causes unnecessary actuation of the evacuation pump, with the attendant above-described disruption in the course of the program and increased water consumption.

German Published, Non-Prosecuted Application DE 39 42 168 A discloses fill control means for a liquid container that has an overflow edge which defines a fill level that leads to a overflow conduit, on which a diaphragm acting on a switch disposed outside the overflow conduit is disposed, and in the switching position the switch closes an inflow valve. A flow resistance is disposed in the constantly evacuated overflow conduit, downstream of the diaphragm located at a distance from the overflow edge. With that configuration, if there is a defect of the fill control means, there is no longer any protection against an overflow of the appliance in question.

It is accordingly an object of the invention to provide a safety device for water-conducting household appliances, which overcomes the hereinafore-mentioned disadvantages of the heretofore-known devices of this general type, and in which unnecessary actuation of the evacuation pump, and complete evacuation of the appliance in the event of a malfunction, with the attendant unnecessary water consumption, and additional steps such as the service call, are avoided.

With the foregoing and other objects in view there is provided, in accordance with the invention, in a water-conducting household appliance including a liquid container having a static content level, fill control means, a cycle control unit, an inflow valve to be opened by the cycle control unit and closed by at least one of the fill control means and the cycle control unit, an evacuation pump, a switch having a switching position in which the switch turns on the evacuation pump and selectably closes the inflow valve, and a chamber hydraulically communicating with the liquid container and having an opening for the entry of water, a safety device, comprising a safety level switch device having a float disposed in the chamber, the float having a switching position in which the float acts upon the switch, and the float having a position of repose in which the float is kept at a slight distance above the static content level and in which the float acts upon the switch to switch off the evacuation pump.

Placing the float a slight distance above the static level avoids unnecessary actuation of the evacuation pump by the water surface, which is in agitated motion. Turning the evacuation pump off again prevents a disturbance in the cycle or inadequate function of the cycle segment, as well as unnecessary water consumption from being caused by overfilling of the liquid container, because the evacuation is terminated no later than upon attainment of the static level. The ongoing cycle continues without additional effort, without the rare malfunctions described above being noticed by the user and without requiring such additional steps as a service call on the appliance.

In accordance with another feature of the invention, the switch being acted upon by the float turns off the evacuation pump upon attainment of the position of repose, following prior assumption of the switching position, and the inflow valve is subsequently kept closed. With this provision, the structure is improved in such a way that even if the static level should fluctuate, the inflow valve is not periodically opened and closed again.

In accordance with a further feature of the invention, the float in the position of repose rests on a bearing surface located on the bottom of the chamber. This assures that the water, at a suitably highly level in the liquid container, can enter the chamber without it already raising the float. In addition, very accurate disposition of the opening becomes unnecessary, since the opening edge no longer determines the switching level of the float.

In accordance with an added feature of the invention, in the position of repose, the float rests on a three-point bearing surface, so that seizing of the float by calcium deposits, for instance, is averted and reliable lifting of the float is assured because the water can get under the float.

In accordance with an additional feature of the invention, the chamber containing the float is spatially separated from the liquid container. This is done in order to avoid unnecessary openings in the liquid container and to better prevent the unnecessary entry of water into the chamber.

In accordance with yet another feature of the invention, the chamber containing the float communicates hydraulically with an overflow conduit of the appliance, in which a flow resistance location is disposed downstream of an opening of the chamber for the entry of water, as seen in the flow direction. In the event of a defect in the fill control means, a constant overflow of water into the overflow conduit takes place. Due to the flow resistance location disposed downstream of the opening of the chamber of the safety level switch device, it is assured that a column of water will build up immediately, which means that water from the overflow conduit will reliably enter the chamber, because of the hydraulic communication of the chamber with the overflow conduit. The safety level switch device accordingly allows monitoring of the function of the fill control means of the appliance, so the escape of water from the appliance can be prevented.

In accordance with yet a further feature of the invention, there is provided a screen protecting the opening for the entry of water. This feature advantageously provides better protection against needless sloshing of water into the chamber from the highly agitated surface of the water in the appliance.

In accordance with yet an added feature of the invention, the screen is a wall being spaced apart from the opening of the chamber and parallel to the plane thereof, the screen having a lower end which ends at a distance above the wall of the connecting line to the liquid container, as seen in the flow direction, and thereby forms the flow resistance. This protects against sloshing water and makes for a practical, structurally simple disposition of a flow resistance location.

Water-conducting or using household appliances are known in which the water for filling them is carried from the inflow valve into a filling tank in which the inflowing quantity of water is defined and metered, and is then carried to the liquid container under the control of the cycle control unit.

Therefore, in such appliances, in accordance with yet an additional feature of the invention, the chamber communicates hydraulically with a filling tank of the appliance, and as a result the level of water flowing into the filling tank can also be controlled by the safety level switch device.

In accordance with again another feature of the invention, the chamber communicates hydraulically with the overflow conduit of the filling tank of the appliance in which the flow resistance location is disposed downstream of the opening of the chamber for the entry of water, as seen in the flow direction. As a result, as described above, if the fill control means of the filling tank should fail, the safety level switch device can take on an additional safety function to protect against overflow of the appliance.

In accordance with again a further feature of the invention, the chamber is disposed in the filling tank of the appliance.

In accordance with a concomitant feature of the invention, the chamber is formed integrally with the filling tank. Additionally required parts that have to be installed can thus be dispensed with.

Other features which are considered a characteristic for the invention are set forth in the appended claims.

Although the invention is illustrated and described herein as embodied in a safety device for water-conducting household appliances, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 3:
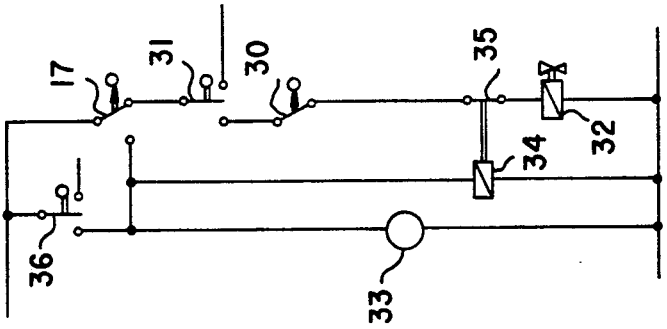
FIG. 3 is a portion of an electrical circuit diagram of such an appliance in a further embodiment of the invention, in which an inflow valve is kept closed after an actuation pump has been turned off.
Figure 2:
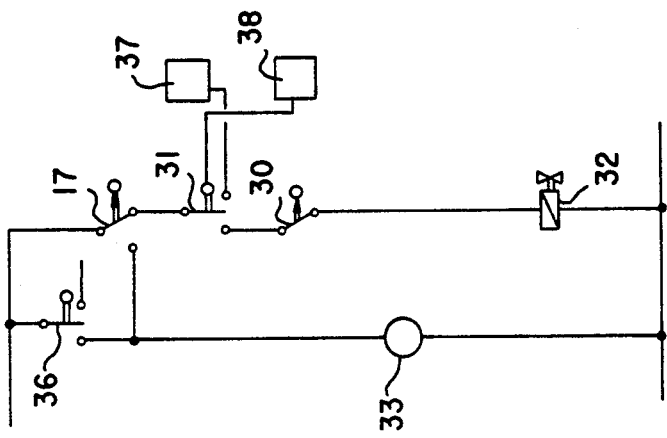
FIG. 2 is a portion of a electrical schematic circuit diagram of such an appliance in an embodiment of the invention.

Referring now in detail to the FIGURES of the drawing, there is seen a water-using, carrying or conducting household appliance including a liquid container 23 and fill control means 37, having a float-actuated switch, for instance, which is indicated by reference numeral 30 in FIGS. 2 and 3, and an inlet valve 32 of an evacuation pump 33 as is also shown in FIGS. 2 and 3. The valve 32 is openable by a cycle control unit 38 through the use of a contact 31 thereof and is closable by the fill control means 37 and/or the cycle control unit 38.

Figure 1:
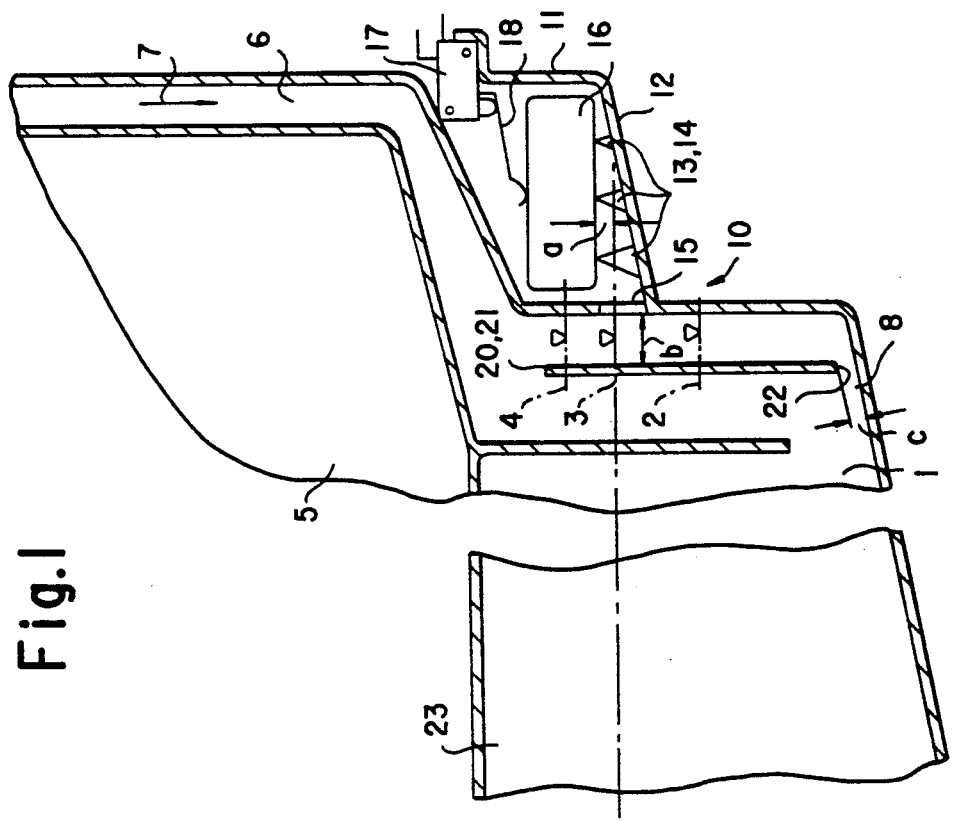
FIG. 1 is a fragmentary, diagrammatic, sectional view of a filling tank of a water-using household appliance with a safety device according to the invention.

As is seen in FIG. 1, a safety level switch device 10 is provided, in which a float 16 is disposed in a chamber 11 communicating hydraulically with a liquid chamber through a connecting line 1. The float 16 acts upon a switch 17, which is also seen in FIGS. 2 and 3. In a position of repose, the float 16 is kept at a slight distance a above a static level 3 to which the liquid container 2 is filled. This is accomplished by providing that in the position of repose, the float 16 rests on a bearing surface 13 that is disposed on a bottom 12 of the chamber 11. This bearing surface 13 is constructed as a three-point bearing surface 14. A contact of the control unit for switching the evacuation pump 33 during normal cycling is indicated by reference numeral 36 FIGS. 2 and 3.

The chamber 11 containing the float 16 is spatially separated from the liquid container 23. An opening 15 of the chamber 11 for the entry of water is protected by a screen 20 that is constructed as a wall 21 which is disposed at a distance b from the opening 15 of the chamber 11 and is parallel to the plane of the opening 15. A lower end 22 of this screen 20, as seen in a flow direction 7, ends at a distance c above a wall of the connecting line 1 leading to the liquid container 23, and as a result forms a flow resistance location 8 disposed downstream of the opening 15 of the chamber 11.

In the embodiment of the invention shown in FIG. 1, the chamber 11 is integrally formed with a filling tank 5 of the appliance and communicates hydraulically with an overflow conduit 6 thereof.

As is shown in FIG. 2, the switch 17 that is acted upon by the float 16 is inserted into a current circuit of the evacuation pump 33 and the inlet or inflow valve 32, in such a way that in the switching position it turns on the evacuation pump 33 and closes the inflow valve 32, and upon attaining the position of repose it turns off the evacuation pump 33.

As is shown in FIG. 3, in addition to this configuration it is possible to keep the inflow valve 32 closed after the evacuation pump 33 has been turned off, by providing a bistable relay 34 that acts upon a switch 35.

Two different normal water levels typically occur in the liquid container 23 of the appliance. If the water filling it is not circulated or moved, it assumes a higher water level at the static level indicated with reference numeral 3, while upon motion or circulation in the appliance it assumes a lower water level, which is a dynamic level indicated with reference numeral 2. Neither of these two normal water levels cause tripping of the safety level switch device 10, even though the water, at least when it reaches the static level 3, has already entered the chamber 11. However, the water level may exceed the static level 3, for instance because the evacuation pump 33 has not completely pumped out the water filling the liquid container 23 in a preceding cycle segment and the amount of water programmed for the new cycle is then being fed in through the inflow valve 32 and the fill control means 37. In such a case, if the water exceeds a safety level indicated by reference numeral 4, it makes the float 16 float upward, out of the position of repose. The float is then in the switching position and actuates the switch 1 through a lever 18 of the switch. The lever 18 rests on the float 16 in such a way as to be resiliently prestressed in the direction of the float 16, counter to the spring force of the lever 18. The switch 17 then turns on the evacuation pump 33 and if filling is still in progress, it also closes the inflow valve 32. As the water level drops down to the static level 3, and also because of the spring force of the lever 18, the float 16 also drops until it is again resting in the position of repose on the three-point bearing surface 14 The switch 17 is likewise placed in the position of repose in this process, and as a result the evacuation pump 33 is turned off again, so that the partial evacuation process is thus ended.

With the safety device according to the invention, the fill control means 37 can also be monitored. If it fails or malfunctions, which typically is supposed to cause the closure of the inflow valve 32, the water in the filling tank 5 in the exemplary embodiment shown, as well as in the non-illustrated embodiment of the invention which lacks a filling tank in the liquid container 23, rises above a typically provided non-illustrated overflow edge by which the water is carried into the overflow conduit 6. Due to the flow resistance location 8 disposed downstream of the opening 15 of the chamber 1, the water that has overflowed immediately forms a column of liquid upstream of the flow resistance location 8 and reaches the chamber 11, where the above-described switching process is tripped, in the course of which the inflow valve 32 is also closed. Since in this situation the malfunction is not supposed to remain unnoticed, the majority of the overflowed water is carried to a point in the appliance at which the appearance of water tells the user that the appliance has malfunctioned.

We claim:

1. In a water-conducting household appliance including a liquid container having a static content level, fill control means, a cycle control units, an inflow valve to be opened by the cycle control unit and closed by at least one of the fill control means and the cycle control unit, an evacuation pump, a switch having a switching position in which said switch turns on the evacuation pump and selectably closes the inflow valve, and a chamber disposed apart from the liquid container and hydraulically communicating with the liquid container and having an opening for the entry of water so as to establish corresponding liquid levels in the liquid container and the chamber, a safety device comprising a safety level switch device having a float disposed in the chamber apart from the liquid container, said float having a switching position in which said float acts upon the switch to switch on the evacuation pump, and selectably close the inflow valve when the liquid level rises to a predetermined level above the static content level and means for supporting said float in position of repose in which said float is kept at a distance above the static content level and in which said float acts upon the switch to switch off the evacuation pump when the liquid level approaches the static content level.

2. The safety device according to claim 1, wherein the switch turns off the evacuation pump upon attainment of the position of repose, following a previous assumption of the switching position, and the inflow valve is subsequently kept closed.

3. The safety device according to claim 1, wherein said means for supporting is disposed within the chamber said chamber has a bottom with a bearing surface on which said float rests in the position of repose.

4. The safety device according to claim 3, wherein said bearing surface is a three-point bearing surface.

5. The safety device according to claim 1, wherein the chamber is spatially separated from the liquid container.

6. The safety device according to claim 1, including an overflow conduit communicating hydraulically with the chamber, said overflow conduit having a flow resistance location disposed downstream of the opening of the chamber for the entry of water, as seen in flow direction.

7. The safety device according to claim 6, including a connecting line leading from the chamber to the liquid container and having a connecting line wall, and a screen protecting the opening of the chamber for the entry of water, the opening of the chamber being disposed in a given plane, said screen being a wall spaced apart from the opening of the chamber parallel to the given plane, and said wall having a lower end ending at a distance above the connecting line wall, as seen in the flow direction, forming said flow resistance location.

8. The safety device according to claim 6, including a filling tank, said overflow conduit communicating hydraulically with the chamber and with the filling tank.

9. The safety device according to claim 8, wherein the chamber is disposed in the filling tank.

10. The safety device according to claim 8, wherein the chamber is integral with the filling tank.

11. The safety device according to claim 1, including a screen protecting the opening of the chamber for the entry of water.

12. The safety device according to claim 1, including a filling tank communicating hydraulically with the chamber.

* * * * *